United States Patent [19]

Larsson et al.

[11] 4,400,280
[45] Aug. 23, 1983

[54] METHOD AND APPARATUS FOR SUPPLYING DISTRIBUTING COMPOSITE LIQUIDS TO A LAMINAR SEPARATION APPARATUS

[75] Inventors: Hans F. Larsson, Västerhaninge; Sven Håkansson, Nynäshamn, both of Sweden

[73] Assignee: Axel Johnson Engineering, AB, Nynaeshamn, Sweden

[21] Appl. No.: 345,394

[22] Filed: Feb. 3, 1982

Related U.S. Application Data

[63] Continuation of Ser. No. 206,557, Nov. 13, 1980, abandoned.

[30] Foreign Application Priority Data

Nov. 20, 1979 [SE] Sweden ................................. 7909609

[51] Int. Cl.³ ............................................. B01D 21/24
[52] U.S. Cl. .................... 210/802; 210/519; 210/521; 210/DIG. 5
[58] Field of Search ............... 210/802, 801, 519, 521, 210/522, DIG. 5

[56] References Cited

U.S. PATENT DOCUMENTS

| | | | |
|---|---|---|---|
| 2,060,166 | 11/1936 | Bowen | 210/521 |
| 2,751,998 | 6/1956 | Glasgow | 210/521 |
| 3,460,677 | 8/1969 | Fifer | 210/521 |
| 3,521,756 | 7/1970 | Kaminsky | 210/521 |
| 3,563,389 | 2/1971 | Mizrahi | 210/521 |
| 3,826,740 | 7/1974 | Jewett | 210/521 |
| 3,849,311 | 11/1974 | Jakubek | 210/521 |
| 3,914,175 | 10/1975 | Kunz | 210/522 |
| 4,022,688 | 5/1977 | Wikholm | 210/522 |
| 4,113,629 | 9/1978 | Pielkenrood | 210/522 |
| 4,120,796 | 10/1978 | Huebner | 210/522 |
| 4,132,651 | 1/1979 | de Jong | 210/522 |
| 4,132,652 | 1/1979 | Anderson | 210/DIG. 5 |
| 4,133,771 | 1/1979 | Pielkenrood | 210/521 |
| 4,191,651 | 3/1980 | Cheysson | 210/522 |
| 4,202,778 | 5/1980 | Middelbeek | 210/522 |
| 4,257,895 | 3/1981 | Murdock | 210/521 |

FOREIGN PATENT DOCUMENTS

| | | | |
|---|---|---|---|
| 1063149 | 4/1954 | France . | |
| 2037602 | 7/1980 | United Kingdom | 210/DIG. 5 |
| 709115 | 1/1980 | U.S.S.R. | 210/519 |

OTHER PUBLICATIONS

Lamella, Bulletin LT-103, Corporation, a Subsidiary of A. Johnson & Co. Inc.

*Primary Examiner*—Ernest G. Therkorn
*Attorney, Agent, or Firm*—Brumbaugh, Graves, Donohue & Raymond

[57] ABSTRACT

Arrays of baffles are disposed in apparatus for distributing a composite liquid to the separation passages of a multi-plate laminar separation apparatus to decelerate the influent composite liquid and repeatedly deflect its direction of flow such that it is uniformly distributed to the separation passages in the apparatus.

12 Claims, 7 Drawing Figures

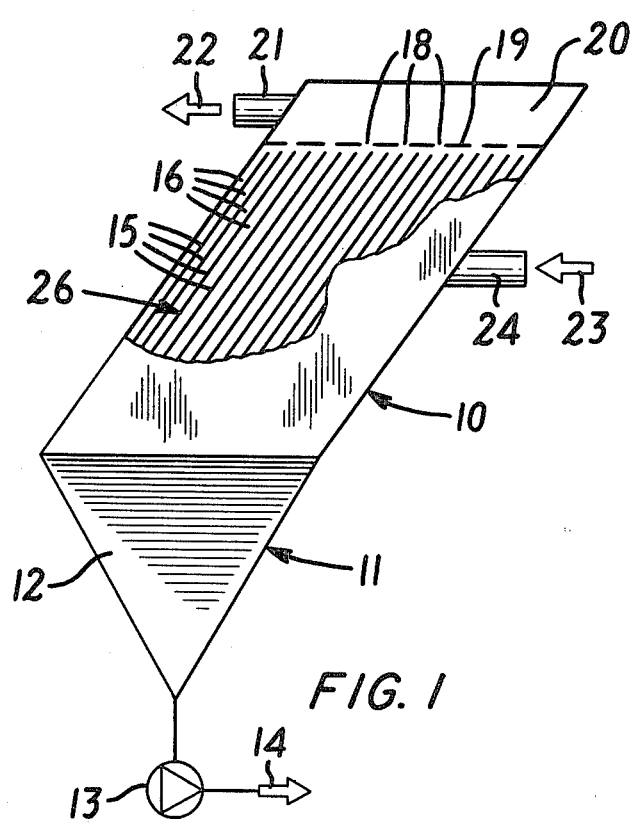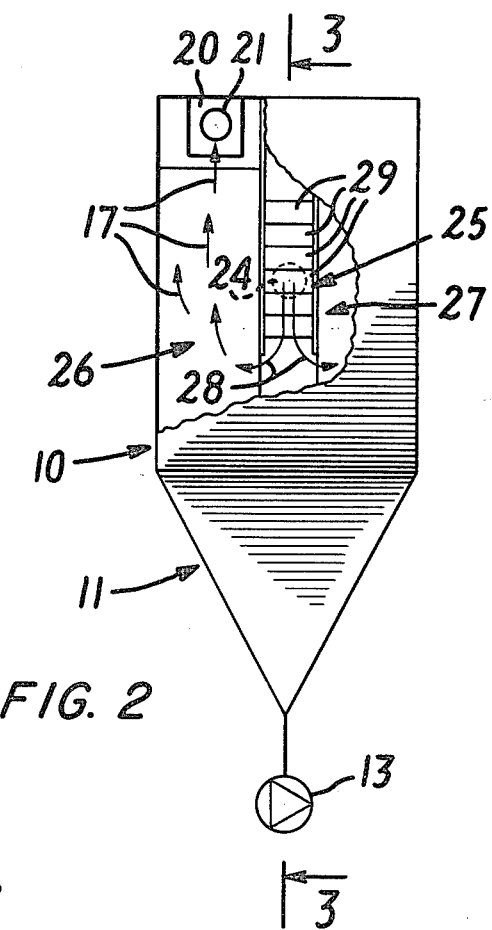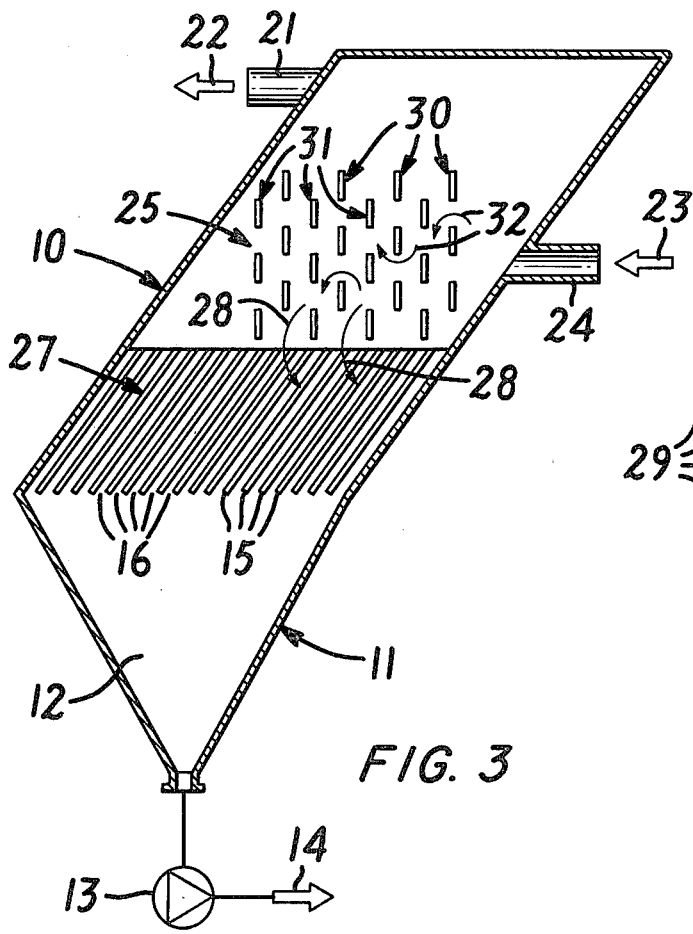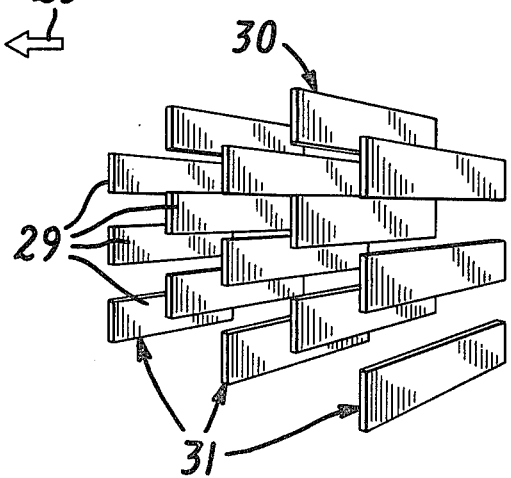
FIG. 1
FIG. 2
FIG. 3
FIG. 4

METHOD AND APPARATUS FOR SUPPLYING DISTRIBUTING COMPOSITE LIQUIDS TO A LAMINAR SEPARATION APPARATUS

This is a continuation of application Ser. No. 206,557, filed Nov. 13, 1980, now abandoned.

BACKGROUND OF THE INVENTION

The present invention relates to laminar separation methods and apparatus and, more particularly, to new and improved methods and apparatus of this character embodying simple yet highly effective means for supplying and distributing a composite liquid such as a suspension or emulsion uniformly to the respective separation channels in the apparatus.

In conventional laminar separation apparatus, separation of sediment from a suspension or of liquids in an emulsion is accompanied by supplying the suspension or emulsion to a plurality of separation passages formed between a plurality of parallel, spaced apart plates, all inclined with respect to a horizontal plane. In operation, the sediment in the suspension or the heavier liquid in the emulsion sinks downwardly in the separation passages, flows past the lower edges of the plates, and is removed at the bottom of the separation apparatus, while the remaining liquid flows upwardly and is eventually discharged through outlets at the upper ends of the plate passages.

The influent suspension or emulsion is usually supplied to the separation passages via a distributor positioned close to the plates so that the influent supplied therefrom is allowed to flow into the passages between the plates. Preferably, the distributor is positioned laterally of a plate array or between two plate arrays and is provided with side walls, so that the influent is forced downwardly and enters the passages between the plates some distance below the top edges of the latter. The influent enters the distributor via an inlet form above, or preferably laterally.

For a complete utilization of the capacity of the laminar separation apparatus, it is of the utmost importance to obtain an even and uniform distribution of the influent composite liquid to the separation passages. In prior apparatuses, however, it has been difficult to accomplish this result. To begin with, the influent entering the distributor is highly concentrated and also undirected. This tends to overload certain separation passages positioned some distance from the inlet pipe, while other closer as well as more remote separation passages receive too low a load. Load in this respect relates to the amount of suspension or emulsion per unit time flowing into a separation passage. In some cases, certain separation passages do not receive any influent from the distributor; instead only clarified liquid enters the separation passage from the outlet of the distributor. Optimum operation obtains when the influent flow is evenly and uniformly distributed over all of the separation passages.

SUMMARY OF THE INVENTION

According to the invention, an even distribution of the flow of an influent composite liquid to the separation passages of a laminar separation apparatus is secured by decelerating the movement of the influent in the distributing space and deflecting its direction of motion several times before it flows into passages between the plates. This is accomplished by interposing in the flow path a plurality of obstacles or baffles suitably positioned and shaped to decelerate the flow of the influent and change its direction several times, and to divide it into a plurality of smaller flows resulting in dissipation of the kinetic energy of the influent.

DESCRIPTION OF THE PREFERRED EMBODIMENTS

For a better understanding of the invention, reference is made to the following detailed description taken with reference to the accompanying drawings, in which:

FIG. 1 is a side view, with the side wall partially broken away, showing a portion of a laminar separation apparatus embodying the invention;

FIG. 2 is an end view, partially broken away, of the laminar separation apparatus of FIG. 1, as viewed from the left in FIG. 1;

FIG. 3 is a view in longitudinal section, taken along the line 3—3 of FIG. 2 and looking in the direction of the arrows;

FIG. 4 illustrates in perspective view one form of flow modifying baffle array according to the invention;

Figure 5:
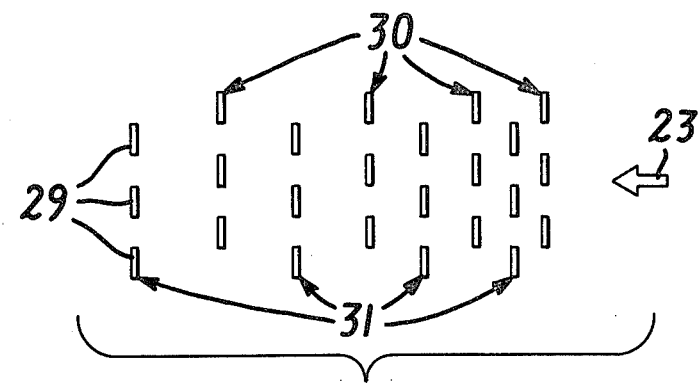
FIGS. 5 and 6 are side views illustrating other forms of flow-modifying baffle arrays according to the invention.

As shown in FIGS. 1, 2 and 3, a respesentative laminar separation apparatus according to the invention has a separation chamber 10 and an outlet portion 11 comprising a funnel-shaped trough 12 into which separated liquid or sediment descends and is pumped out by a conventional pump means 13 as indicated by the arrow 14. Mounted in the separation chamber 10 are a plurality of parallel, spaced apart plates which are inclined to the horizontal and form separate separation passages 16 therebetween. Separation takes place in each separation passage 16, independently of the other separation passages, in such manner that the solid particles in a suspension or the heavier liquids in an emulsion sink to the upper surface of the lower plate in each passage and thereafter slide down therealong to the trough 12. The clarified liquid ascends adjacent to the upper plate in each passage 16, as indicated by the arrows 17 in FIG. 2, and flows out through openings 18 in a horizontal plate 19 at the upper ends of the plates 15 to enter a channel 20 positioned in the upper portion of the laminar separation apparatus. The channel 20 is provided with an outlet opening 21 for discharge (arrow 22) of the clarified liquid from the laminar separation apparatus.

The influent composite liquid such as a suspension or emulsion is supplied (arrow 23) to the laminar separation apparatus via an inlet 24 to a distributor 25 which extends between two plate arrays 26 and 27. A channel 20 is positioned above each plate array and the influent flows laterally into the arrays 26 and 27 as illustrated by the arrows 28.

According to the invention, a plurality of obstacles in the form of plate baffles 29 are positioned in one or more arrays in the distributor 25. In the particular embodiment shown in FIGS. 3 and 4, the baffles are placed in two vertical arrays 30 and 31 that are spaced apart alternately in the flow direction of the influent suspension or emulsion entering through the inlet pipe 24 with the broad side of each baffle facing the flow. In this embodiment, the arrays 30 and 31 are displaced vertically so that the baffles in one array 30 face the gaps between the vertically spaced apart baffles in the other array 31, thus forming a plurality of tortuous passages through which the influent is caused to flow. In this way, the influent flow is decelerated and is divided into a plurality of flow components which change directions several times, as illustrated by the arrows 32 in FIG. 3.

In the modified baffle arrangement shown in the embodiment of FIG. 5, the spacing between the arrays 30 and 31 of flow modifying baffles according to the invention is successively increased in the direction of flow of the influent. This provides more tortuous passages at the inlet end of the distributor 25, assuring greater uniformity of distribution of the influent between the flow passages 16 for certain applications.

Figure 6:
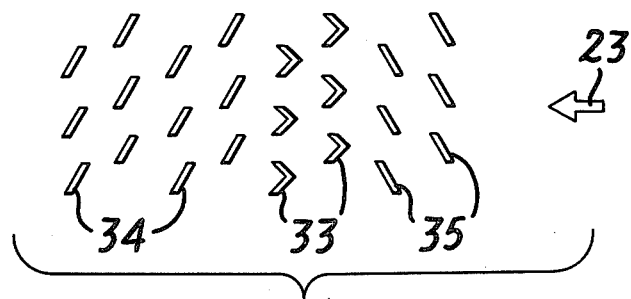

If so desired, the baffles 22 can be suitably shaped or oriented to guide selected flow components of the influent in desired directions. As illustrated in the modified baffle arrangement of FIG. 6, the baffles 33 of one array may be in the form of single irons disposed with the apices facing towards the flow, while other arrays may comprise flat baffles 34 and 35 inclined in either direction with respect to the flow.

Figure 7:
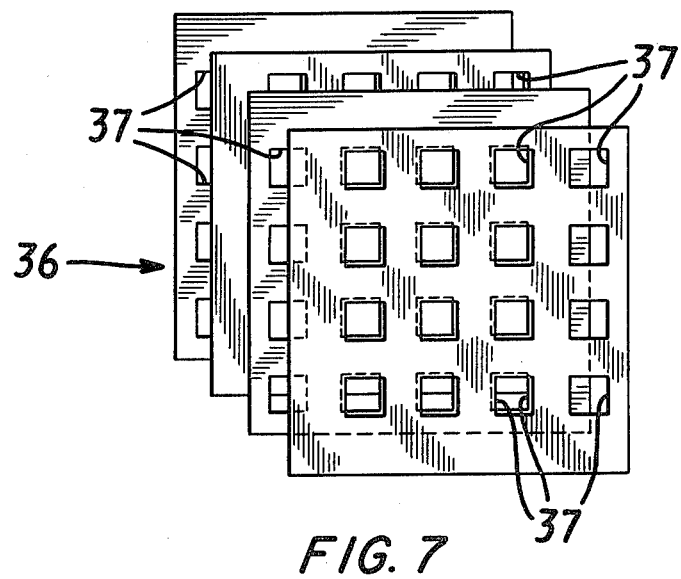
FIG. 7 is a perspective view illustrating still another form of baffle array according to the invention.

Alternatively, as shown in FIG. 7, the arrangement of obstacles may comprise an array of plates 36 spaced apart in the influent flow direction and provided with openings 37. To provide the necessary tortuous path for the influent, the openings 37 in successive plates are laterally displaced with respect to the openings 37 in the preceding plate. Also, guide means may be provided for deflecting the flow.

This invention is not limited to the several embodiments described above but is intended to encompass all modifications in form and detail falling within the scope of the following claims.

We claim:

1. In a method for subjecting an influent composite liquid to separation in laminar separation apparatus comprising a plurality of parallel plates inclined with respect to a horizontal plane and forming a plurality of separation passages therebetween and distributor means communicating with said separation passages for distributing thereto a stream of influent composite liquid received by the distributor means, the distributor means including a fluid flow path in which the direction of flow of composite liquid is changed at least once, the improvement comprising decelerating the motion of the stream of influent composite liquid received into the distributor means prior to any change in the direction thereof by subjecting said stream as it passes in the direction of flow in which it is received into the distributor means to a plurality of deflections in said distributor means to dissipate the kinetic energy thereof, thereby causing the composite liquid to pass from the distributor means uniformily to the plurality of separation passages.

2. In separation apparatus comprising an inlet, a plurality of spaced-apart parallel plates inclined to the horizontal and forming a plurality of separation passages therebetween, and influent distributor means adapted to receive a flow of influent composite liquid flowing in one direction from the inlet and to change the direction of flow of the stream of composite liquid at least once as it passes from the inlet to said separation passages for distributing said influent composite liquid thereto for treatment, the improvement comprising obstacle means disposed in at least one array in said distributor means to intercept the influent composite liquid in the direction of flow in which it is received from the inlet and prior to any change in the flow direction thereof so as to dissipate the kinetic energy thereof and cause the influent composite liquid to be distributed uniformly from the distributor to the plurality of separation passages.

3. Apparatus according to claim 2 including a plurality of arrays of obstacle means spaced both in the direction of influent flow and across the direction of influent flow in which the spaces between obstacle means in the arrays that are spaced across the direction of influent flow are obstructed by obstacle means in a succeeding cross flow obstacle means array in the direction of influent flow.

4. Apparatus according to claim 3 in which the obstacle means are disposed in arrays that are spaced apart both in the direction of influent flow and in the direction normal thereto and the spaces between adjacent obstacle means in each of the arrays that are spaced apart across the direction of influent flow are obstructed by obstacle means in the next succeeding cross flow array in the direction of influent flow.

5. Apparatus according to claim 3 or claim 4 in which the spacing between the obstacle means in the arrays that are spaced apart in the direction of influent flow increases successively with distance in the direction of influent flow, at least for obstacle means closest to the influent inlet into said distributor means.

6. Apparatus according to claim 2 in which the obstacle means comprises a plurality of baffles disposed normal to the direction of influent flow.

7. Apparatus according to claim 2 in which the obstacle means comprises a plurality of baffles which are shaped to guide and change the direction of influent flow.

8. Apparatus according to claim 7 in which the obstacle means comprises a plurality of angle-iron shaped baffles.

9. Apparatus according to claim 7 in which the obstacle means comprises a plurality of baffles disposed at an angle to the direction of influent flow.

10. Apparatus according to claim 2 in which the obstacle means comprises a plurality of plates having laterally displaced openings.

11. In a method for subjecting an influent composite liquid to separation in laminar separation apparatus comprising a plurality of parallel plates inclined with respect to a horizontal plane and forming a plurality of separation passages therebetween and distributor means communicating with said separation passages for distributing thereto a stream of influent composite liquid received by the distributor means, the distributor means including a fluid flow path in which the direction of flow of composite liquid is changed at least twice, the improvement comprising decelerating the motion of the stream of influent composite liquid received into the distributor means prior to any change in the direction thereof by subjecting said stream as it passes in the direction of flow in which it is received into the distributor means to a plurality of deflections in said distributor means to dissipate the kinetic energy thereof, thereby causing the composite liquid to pass from the distributor means uniformly to the plurality of separation passages.

12. In separation apparatus comprising an inlet a plurality of spaced-apart parallel plates inclined to the horizontal and forming a plurality of separation passages therebetween, and influent distributor means adapted to receive a flow of influent composite liquid flowing in one direction from the inlet and to change the direction of flow of the stream of composite liquid at least twice as it passes from the inlet to said separation passages for distributing said influent composite liquid thereto for treatment, the improvement comprising obstacle means disposed in at least one array in said distributor means to intercept the influent composite liquid in the direction of flow in which it is received from the inlet and prior to any change in the flow direction thereof so as to dissipate the kinetic energy thereof and cause the influent composite liquid to be distributed uniformly from the distributor to the plurality of separation passages.

* * * * *

UNITED STATES PATENT AND TRADEMARK OFFICE
CERTIFICATE OF CORRECTION

PATENT NO. : 4,400,280
DATED : August 23, 1983
INVENTOR(S) : Hans Folke Larsson and Sven Hakansson It is certified that error appears in the above—identified patent and that said Letters Patent is hereby corrected as shown below:

First page, Item [54], line 2, after "SUPPLYING" insert --AND--;

Col. 1, line 1, after "SUPPLYING" insert --AND--;

Col. 1, line 39, "form" should read --from--;

Col. 4, line 64, after "inlet" insert a comma.

Signed and Sealed this

Fifteenth Day of November 1983

[SEAL]

Attest:

GERALD J. MOSSINGHOFF

Attesting Officer  Commissioner of Patents and Trademarks